US009174841B2

(12) United States Patent
Hwang et al.

(10) Patent No.: US 9,174,841 B2
(45) Date of Patent: Nov. 3, 2015

(54) SOLID OXIDE FUEL CELL ANODE WITH HIGH STABILITY AND HIGH EFFICIENCY AND METHOD FOR MANUFACTURING THE SAME

(75) Inventors: Chang-Sing Hwang, Taoyuan County (TW); Chun-Liang Chang, Yunlin County (TW); Chih-Ming Chuang, Taichung (TW); Chun-Huang Tsai, Pingtung County (TW); Sheng-Hui Nien, Changhua County (TW); Shih-Wei Cheng, New Taipei (TW)

(73) Assignee: Atomic Energy Council—Institute of Nuclear Energy Research, Taoyuan County (TW)

( * ) Notice: Subject to any disclaimer, the term of this patent is extended or adjusted under 35 U.S.C. 154(b) by 410 days.

(21) Appl. No.: 13/568,536

(22) Filed: Aug. 7, 2012

(65) Prior Publication Data
US 2014/0045099 A1    Feb. 13, 2014

(51) Int. Cl.
| | |
|---|---|
| *B82Y 30/00* | (2011.01) |
| *H01M 8/12* | (2006.01) |
| *H01M 4/86* | (2006.01) |
| *H01M 4/88* | (2006.01) |
| *H01M 4/90* | (2006.01) |
| *H01M 8/02* | (2006.01) |

(52) U.S. Cl.
CPC .............. *B82Y 30/00* (2013.01); *H01M 4/8621* (2013.01); *H01M 4/886* (2013.01); *H01M 8/1226* (2013.01); *H01M 4/9066* (2013.01); *H01M 8/0236* (2013.01); *H01M 2008/1293* (2013.01); *Y02E 60/522* (2013.01); *Y02E 60/525* (2013.01)

(58) Field of Classification Search
CPC . H01M 8/1226; H01M 4/8621; H01M 4/886; H01M 4/9066; H01M 2008/1293
USPC .......................................... 429/486
See application file for complete search history.

(56) References Cited

U.S. PATENT DOCUMENTS

| | | | |
|---|---|---|---|
| 8,053,142 B2 | 11/2011 | Hwang | |
| 2006/0040168 A1* | 2/2006 | Sridhar | 429/40 |
| 2012/0244456 A1* | 9/2012 | Muecke et al. | 429/527 |

OTHER PUBLICATIONS

Mather et al., Combustion Synthesis of Alternative Cu-GCO anodes for SOFCs and Cofiring of Electrolyte-Anode Bilayers at Reduced Temperatures, Apr. 5, 2001, FuelCells 2001, No. 3-4 p. 233-237.*

(Continued)

*Primary Examiner* — Helen O Conley
(74) *Attorney, Agent, or Firm* — Rosenberg, Klein & Lee (57) ABSTRACT

A nanostructured anode of solid oxide fuel cell with high stability and high efficiency and a method for manufacturing the same are revealed. This anode comprising a porous permeable metal substrate, a diffusion barrier layer and a nano-composite film is formed by atmospheric plasma spray. The nano-composite film includes a plurality of metal nanoparticles, a plurality of metal oxide nanoparticles, and a plurality of gas pores that are connected to form nano gas channels. The metal nanoparticles are connected to form a 3-dimensional network that conducts electrons, while the metal oxide nanoparticles are connected to form a 3-dimensional network that conducts oxygen ions. The network formed by metal oxide nanoparticles has certain strength to separate metal nanoparticles and prevent aggregation or agglomeration of the metal nanoparticles. Thus this anode can be applied to a solid oxide fuel cell operating in the intermediate temperatures (600~800° C.) with high stability and high efficiency.

11 Claims, 5 Drawing Sheets

(56) References Cited

OTHER PUBLICATIONS

Michael Tucker, Progress in Metal-Supported Solid Oxide Fuel Cells: A Review; Journal of Power Sources 195 (2010), pp. 4570-4582.

Wang, Jin-Xia, Ji, Yuan Xu Da-Peng, He Tian-Min, Wang Wei-Ran, Zhou Xian-Feng, Su Wen-Hui; Influence of Size of NO On the Electrochemical Properties for SOFC Anodes; Chemical Journal of Chinese Universities; vol. 25, No. 3, 2004, pp. 501-503.

Chang-Sing Hwang, Chun-Huang Tsai, Jen-Feng Yu, Chun-Liang Chang, Jun-Meng Lin, Yaw-Hwa Shiu, Shih-Wei Cheng; High-Performance Metal-Supported Intermediate Temperature Solid Oxide Fuel Cells Fabricated by Atmospheric Plasma Spraying; Journal of Power Sources 196 (2011) pp. 1932-1939.

Madhumita Mukhopadhyay, Jayanta Mukhopadhyay, Abhijit Das Sharma, Rajendra N. Basu, Engineered Anode Structure for Enhanced Electrochemical Performance of Anode-Supported Planar Solid Oxide Fuel Cell; SciVerse ScienceDirect, International Journal of Hydrogen Energy 37 (2012) pp. 2524-2534.

Zhenwei Wang, Jorg Oberste Berghaus, Sing Yick, Cyrille Deces-Petit, Wei Qu, Rob Hui, Radenka Maric, Dave Ghosh, Dynamic Evaluation of Low-Temperature Metal-Supported Solid Oxide Fuel Cell Oriented to Auxiliary Power Units; ScienceDirect, Journal of Power Sources 176 (2008) pp. 90-95.

Xingyan Xu, Changrong Xia, Shouguo Huang, Dingkun Peng; YSZ Thin Films Deposited by Spin-Coating for IT-SOFCs; Ceramics International 31 (2005) pp. 1061-1064.

\* cited by examiner

SOLID OXIDE FUEL CELL ANODE WITH HIGH STABILITY AND HIGH EFFICIENCY AND METHOD FOR MANUFACTURING THE SAME

BACKGROUND OF THE INVENTION

1. Fields of the Invention

The present invention relates to an anode of solid oxide fuel cell and a method for manufacturing the same, especially to a nanostructured anode of solid oxide fuel cell with high stability of operation and high efficiency of power generation and a method for manufacturing the same.

2. Descriptions of Related Art

Solid oxide fuel cells (SOFC) are devices that utilize electrochemical reactions to generate electric power. In the SOFC operation, generally, oxygen (or air) and hydrogen are used to produce electric power and water. This kind of fuel cells is efficient and free of pollution. Due to environmental issues such as oil depletion and global warming, using the solid oxide fuel cell system as a new clean alternative energy source has become a commonly progressive choice for developed countries.

The SOFC consisted of solid components can be classified into two groups, i.e. planar and tubular type. The energy densities per volume of planar type SOFC are higher than those of tubular type. Thus the planar type has received much attention and become the core of the study. For planar type SOFC, enough mechanical strength is required to support the stacked cells. According to the support material of cell, the planar type SOFC is divided into four subtypes-anode supported, electrolyte supported, cathode supported and metal supported.

The electrolyte supported SOFC has features of relatively higher stability (low degradation rate) and lower energy densities (lower efficiency). Thus anode supported intermediate temperature SOFC with the cermet support structure gets an increased attention in the world. The cermet support of anode supported solid oxide fuel cell is a uniform mixture of ceramic with metal, such as YSZ (yttria stabilized zirconia) with Ni. However, the cermet has issues of high cost, difficult to process, fragile, and having relatively low thermal shock resistance and low thermal conductivity. Toward lowing operation temperatures of SOFC, as being pointed out by Wang et al., "Dynamic evaluation of low-temperature metal-supported solid oxide fuel cell oriented to auxiliary power units," *J. Power Sources,* 176, 90, 2008; Tucker, "Progress in metal-supported solid oxide fuel cells: A review," *J. Power Sources,* 195, 4570, 2010 and Hwang et al., "High performance metal-supported intermediate temperature solid oxide fuel cells fabricated by atmospheric plasma spraying," *J. Power Sources,* 196, 1932, 2011, the planar metal-supported SOFC has received growing attentions and there is a tendency to shift ceramic-supported fuel cells to metal-supported fuel cells, due to the potential benefits of low cost, high strength, better workability, good thermal conductivity and quicker start-up. No matter which type of SOFC is developed, major goals of the current research are to reach the requirements of low cost, high efficiency electric power generation, and high stability of operation.

For a solid oxide fuel cell, Yttria-stabilized zirconia (YSZ) is commonly used as the electrolyte material, Ni/YSZ is currently the most common anode material, and LSM (lanthanum strontium-doped manganite) with perovskite structure is the most currently used cathode material. However, since yttria-stabilized zirconia (YSZ) exhibits sufficient ion conductivity only at high temperatures within a range from 900 to 1000° C., the solid oxide fuel cell made from high-temperature materials with high cost is thus not widely used.

Therefore, in the prior art such as Xu et al., "YSZ thin films deposited by spin-coating for IT-SOFCs," *Ceramics International,* 31, 1061, 2005, a thinner yttria-stabilized zirconia (YSZ) electrolyte layer about or less than 5 μm is provided to reduce the resistance and loss under the working temperature lower than 900° C. Alternatively, an electrolyte made of lanthanum strontium gallate magnesite (LSGM) with high ion conductivity can be used to manufacture a solid oxide fuel cell that works at intermediate temperature (600 to 800° C.) with lower manufacturing cost. As the operating temperature of the SOFC system is reduced, the reliability and durability of the SOFC system are significantly improved so that it is helpful to make the SOFC system more acceptably used in home and car applications.

However, when the working temperature of the SOFC is reduced, electrochemical activities of the cathode and the anode also decrease. Thus, the polarization resistances of cathode and anode increase and so does the energy loss. New materials for the cathode and the anode, such as $Sm_{0.5}Sr_{0.5}CoO_{3-\delta}$ cathode material and anode composite material containing nickel and LDC (Lanthanum doped Ceria), are required. Moreover, in the prior art, micron-structured cathode and anode are mostly given, these cathode and anode should be changed into having nano-structured features so as to increase the number of triple-phase boundaries (TPB) and improve the electrochemical activities of cathode and anode, and then the energy loss of cell can be reduced.

In the prior art, such as Mukhopadhyay et al., "Engineered anode structure for enhanced electrochemical performance of anode-supported planar solid oxide fuel cell," *International J. of Hydrogen Energy,* 37, 2522, 2012, it has been proposed that a cermet anode for a low-temperature and high power density SOFC consists of a thin layer having smaller pores and a thick layer having large pores. The diameter of the small pore should be as smaller as possible. Hence, it is preferred to having the nano-scale pores so as to increase the number of triple-phase boundaries (TPB), but no details on nano-structures of this thin layer with nano pores are revealed in that prior art.

Furthermore, a nanostructuted SOFC anode containing a mixture of nano NiO and micron YSZ is disclosed by Wang in "Influence of size of NiO on the electrochemical properties for SOFC anode," *Chemical Journal of Chinese Universities,* 2003, it is produced by high pressure pressing, then sintering and hydrogen reducing at high temperatures. Such SOFC anode has advantages of increased TPB and reduced electrode energy loss. But the particle sizes, especially the nano nickel particles, of the anode change and increase, due to the high temperature operation and sintering processes. Once the sizes of particles in the anode increase, the number of TPB is reduced.

The SOFC can be manufactured by a plurality of methods including tape casting, pulsed laser deposition (PLD) and atmospheric plasma spray. In the methods without high-temperature sintering process, the atmospheric plasma spray has a higher deposition rate for forming a film. Moreover, the temperature of atmospheric plasma flame is so high that it melts or semi-melts injected powder materials quickly, and when these molten or semi molten powder materials hit a substrate, a film is formed on the substrate in a very short time. This is beneficial to producing a nanostructured anode, because the sizes of the powder materials almost remain unchanged during the film growth process. It is difficult to achieve this in the high temperature sintering process for forming such anode film.

Refer to U.S. Pat. No. 8,053,142, a nanostructured composite anode with nano gas channels and an atmosphere plasma spray manufacturing method thereof are disclosed. The nanostructured composite anode with nano gas channels increases the number of TPB and reduces the anode resistance. However, in that patent, no concrete measures on how to ensure the long-term stability of a nanostructured composite anode are disclosed.

In the past, the nanoparticles in nanostructured electrodes have been considered to be quite active and can agglomerate or aggregate to form larger particles. This phenomenon affects the stability of the nanostructured electrodes. Thus there is a need to provide an anode for a high stability and high efficiency solid oxide fuel cell, and a method for manufacturing the same. The operated solid oxide fuel cell with such an anode can have high efficiency and long-term stability at the intermediate temperature range (600~800° C.).

SUMMARY OF THE INVENTION

Therefore it is a primary object of the present invention to provide a solid oxide fuel cell anode with high stability and high efficiency, and a method for manufacturing the same in which a diffusion barrier layer and a nano-composite film are deposited on a prepared porous permeable metal substrate by atmospheric plasma spray so as to achieve a high efficient and long-term stable metal-supported SOFC anode.

It is another object of the present invention to provide a solid oxide fuel cell anode with high stability and high efficiency and a method for manufacturing the same, in which metal nanoparticles and the metal oxide nanoparticles are respectively connected to form two corresponding 3-dimensional (3D) networks that conducts electrons and oxygen ions. The network formed of metal oxide nanoparticles has certain enough strength to prevent the agglomeration or aggregation of the metal nanoparticles. Thus the agglomeration or aggregation of metal nanoparticles in the nanostructured anode can be avoided, in addition to eliminating the reaction of metal nanoparticles with the porous permeable metal substrate, which further affects the long term stability of anode.

In order to achieve the above objects, a solid oxide fuel cell anode with high stability and high efficiency and a method for manufacturing the same of the present invention are provided. The solid oxide fuel cell anode with high stability and high efficiency includes a porous permeable metal substrate, a diffusion barrier layer disposed over the porous permeable metal substrate, and a nano-composite anode function layer or film disposed over the diffusion barrier layer. The nano-composite film consists of a plurality of metal nanoparticles, a plurality of metal oxide nanoparticles, and a plurality of nano gas pores. A plurality of connected nano gas pores form a plurality of nano gas channels. The sizes of the metal nanoparticles are larger than the sizes of the metal oxide nanoparticles, especially the sizes of the metal nanoparticles are about 2 to 4 times of those of the metal oxide nanoparticles. The metal nanoparticles are connected one another to form a 3-dimensional (3D) electrically conductive network while the metal oxide nanoparticles are connected one another to form a 3D network that conducts oxygen ions. The 3D electrically conductive network and the 3D oxygen ion conductive network are interlaced or intermixed with each other, and the nano gas channels are connected nano gas pores formed between the metal nanoparticles and the metal oxide nanoparticles by hydrogen reduction reaction. The 3D network that conducts oxygen ions has certain enough strength to prevent the agglomeration or aggregation of the metal nanoparticles at SOFC operation temperatures.

As to the method for manufacturing the solid oxide fuel cell anode with high stability and high efficiency, it includes following steps. Firstly, to preheat a porous permeable metal substrate, then to deposit a diffusion barrier layer formed of the first powder clusters over the porous permeable metal substrate by a high temperature plasma flame produced in atmospheric plasma spray. Next, to deposit a nano-composite film formed of the second powder clusters over the diffusion barrier layer by a high temperature plasma flame produced in atmospheric plasma spray, finally, to reduce the nano-composite film by hydrogen reduction.

BRIEF DESCRIPTION OF THE DRAWINGS

The structure and the technical means adopted by the present invention to achieve the above and other objects can be best understood by referring to the following detailed descriptions of the preferred embodiments and the accompanying drawings, wherein.

DETAILED DESCRIPTION OF THE PREFERRED EMBODIMENT

Figure 1:
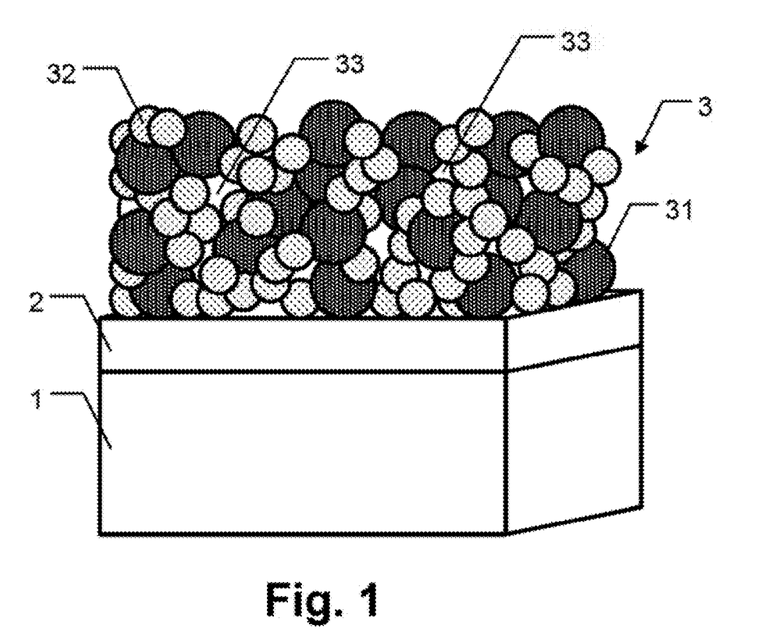
FIG. 1 is a schematic drawing showing structure of an embodiment according to the present invention.

In order to make nanostructured anode of a solid oxide fuel cell to have high efficiency and stability, as shown in FIG. 1, a solid oxide fuel cell anode of the present invention includes a porous permeable metal substrate 1, a diffusion barrier layer 2, a nano-composite film 3, a plurality of metal nanoparticles 31, a plurality of metal oxide nanoparticles 32, and a plurality of nano gas pores 33. A plurality of connected nano gas pores 33 form a plurality of nano gas channels.

The diffusion barrier layer 2 is disposed over the porous permeable metal substrate 1 and the nano-composite film 3 is disposed over the diffusion barrier layer 2. The atmospheric plasma spraying method is used to form the diffusion barrier layer 2 on the porous permeable metal substrate 1 and the nano-composite film 3 on the diffusion barrier layer 2. The nano-composite film 3 is formed of the metal nanoparticles 31, the metal oxide nanoparticles 32 and nano gas pores 33. The metal nanoparticles 31, the metal oxide nanoparticles 32 and nano gas pores 33 are intermixed one another so that there are sufficient metal oxide nanoparticles 32 around each of metal nanoparticles 31 to provide certain enough strength for preventing the agglomeration or aggregation of the metal nanoparticles 31 at SOFC operation temperatures. The nano gas channels are connected nano gas pores 33 formed between the metal nanoparticles 31 and the metal oxide nanoparticles 32 by hydrogen reduction reaction.

After the nano-composite film 3 is prepared by atmospheric plasma spraying method and reduced by hydrogen, the metal nanoparticles 31, the metal oxide nanoparticles 32 and nano gas pores 33 are intermixed one another. The connected nano gas pores form nano gas channels, the connected metal nanoparticles 31 form one 3-dimensional (3D) network and the connected metal oxide nanoparticles 32 form the other 3-dimensional (3D) network, these two 3-dimensional networks are interlaced and intermixed with each other evenly. The network formed by the metal oxide nanoparticles 32 has certain enough strength to prevent the agglomeration or aggregation of the metal nanoparticles 31 at SOFC operation temperatures. In SOFC operation, the 3D network formed by the metal nanoparticles 31 is a 3D electron conductive network, while the 3D network formed by the metal oxide nanoparticles 32 is a 3D oxygen ion conductive network.

The porous permeable metal substrate 1 is a substrate with high electron conductivity and gas permeability. This substrate is made of nickel, nickel alloy, stainless steel, iron-nickel alloy, or iron-chromium alloy. The thickness of the porous permeable metal substrate 1 ranges from 0.6 mm to 2.0 mm and its permeability is larger than 1 Darcy.

Figure 2:
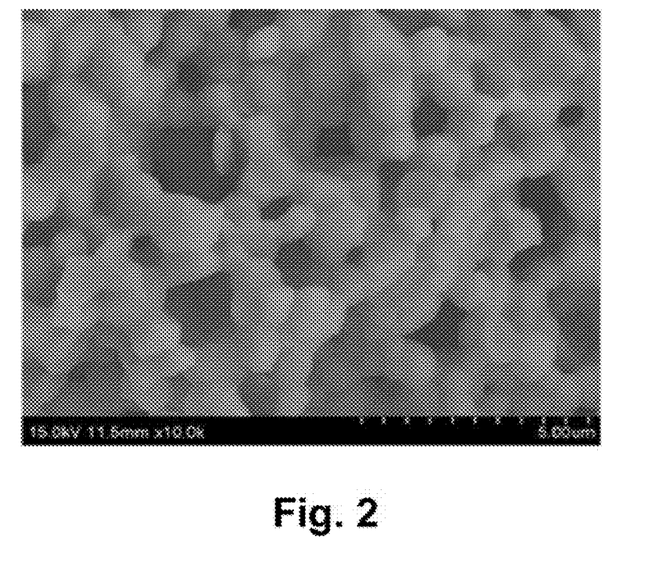
FIG. 2 is a cross sectional SEM photo of a diffusion barrier layer of an embodiment according to the present invention.

The diffusion barrier layer 2 is a permeable film. As shown in FIG. 2, which is a SEM (Scanning Electron Microscopy) photo, the diffusion barrier layer 2 includes pores whose diameter is smaller than 5 micrometers (μm) to allow hydrogen gas to pass through. The material for the diffusion barrier layer 2 is a perovskite structured compound (oxide) such as lanthanum strontium manganese chromite (LSCM), or lanthanum strontium manganese cobaltite, or lanthanum strontium chromite, or lanthanum strontium cobaltite. In the present invention, $La_{0.75}Sr_{0.25}Cr_{0.5}Mn_{0.5}$ (LSCM) is used for example and a thickness of the diffusion barrier layer 2 is ranging from 10 μm (micrometers) to 20 μm.

Figure 3:
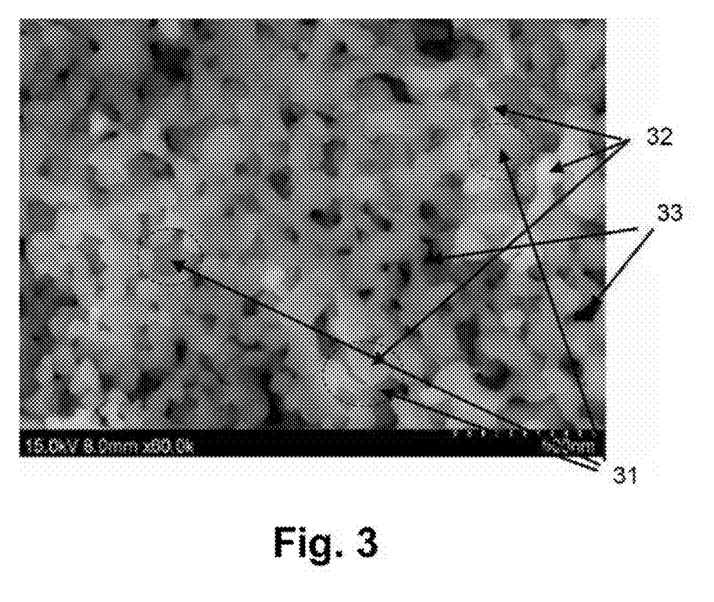
FIG. 3 is a cross sectional SEM photo of a nano-composite film of an embodiment according to the present invention.

After hydrogen reduction, the nano-composite film 3, as shown in FIG. 3, is formed of the metal nanoparticles 31, the metal oxide nanoparticles 32 and nano gas pores 33. These constituents are intermixed one another. The thickness of the nano-composite film 3 ranges from 20 μm to 30 μm. The sizes of the metal oxide nanoparticles 32 are smaller than those of the metal nanoparticles 31. The sizes of the metal oxide nanoparticles 32 usually range from 10 nm to 40 nm and the sizes of metal nanoparticle 31 usually range from 30 nm to less than 100 nm, hence, the size of particle 32 is about 2-4 times smaller than that of particle 31. The size of the nano gas pores 33 and the size of the nano gas channel are smaller than 100 nanometers. The metal oxide nanoparticle 32 made of yttrium stabilized zirconia, scandia stabilized zirconia, gadolinia-doped ceria (GDC), or lanthanum-doped ceria (LDC) can conduct oxygen ions at SOFC operation temperatures.

The connected nano gas pores 33 form nano gas channels that allow hydrogen gas and water vapor in the solid oxide fuel cell anode to flow through. As shown in FIGS. 1 and 3, this kind of 3D space arrangement of metal nanoparticles 31, metal oxide nanoparticles 32 and nano gas pores 33, significantly increases triple-phase boundaries (TPB) among them and connection paths of metal nanoparticles 31. The triple-phase boundaries are the electrochemical reaction sites of oxidizing hydrogen fuel in the anode. Therefore, the nano-structured anodes with larger number of triple-phase boundaries and larger number of connection paths of metal nanoparticles 31 have significantly reduced anode polarization and ohmic resistances.

Figure 4:
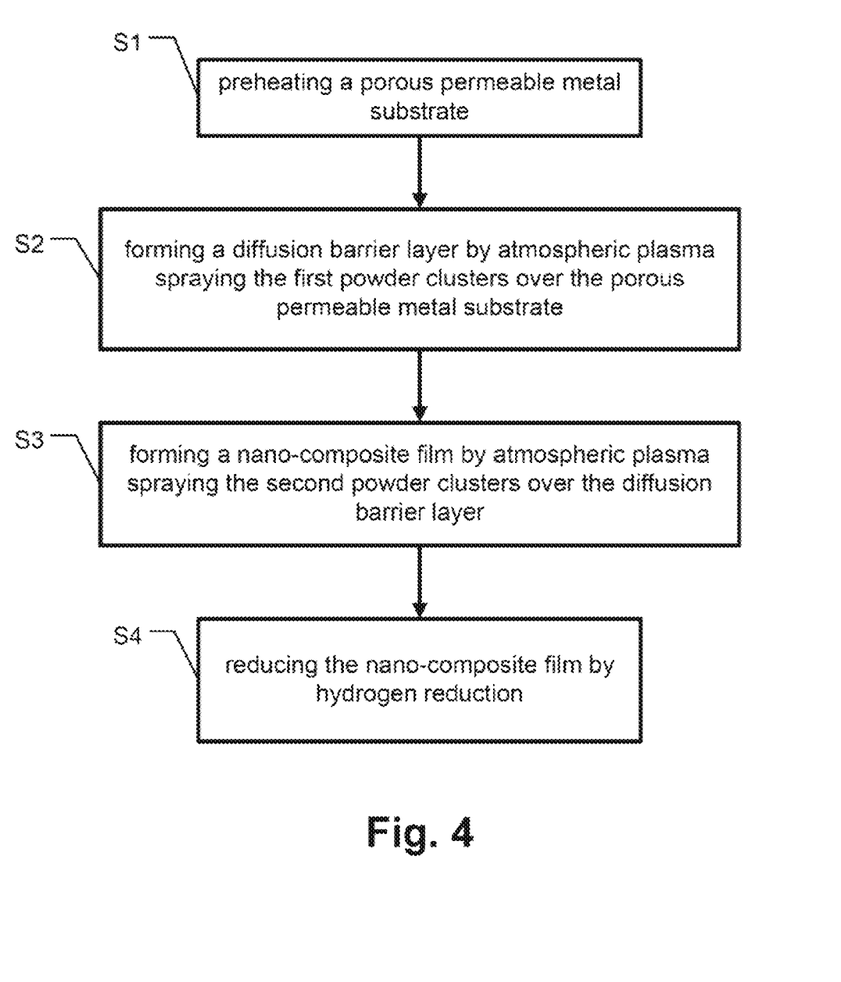
FIG. 4 is a flow chart showing steps of manufacturing an embodiment according to the present invention.

The solid oxide fuel cell anodes with high stability and high efficiency of the present invention are manufactured by atmospheric plasma spray. Refer to FIG. 4, a method for manufacturing a solid oxide fuel cell anode with high stability and high efficiency includes following steps:

Step S1: preheat a porous permeable metal substrate;
Step S2: to form a diffusion barrier layer by atmospheric plasma spraying the first powder clusters over the porous permeable metal substrate;
Step S3: to form a nano-composite film by atmospheric plasma spraying the second powder clusters over the diffusion barrier layer; and
Step S4: to reduce the nano-composite film by hydrogen reduction.

In the beginning, the porous permeable metal substrate 1 is preheated to 600-900° C. The materials for the porous permeable metal substrate 1 are nickel, nickel alloy, stainless steel, iron-nickel alloy, or iron-chromium alloy. Then the first powder clusters heated by a high temperature plasma flame produced in atmospheric plasma spray form a diffusion barrier layer 2 over the porous permeable metal substrate 1.

The first powder clusters are micron scale powder clusters including a perovskite structured compound such as lanthanum strontium manganese chromite (LSCM), or lanthanum strontium manganese cobaltite, or lanthanum strontium chromite, or lanthanum strontium cobaltite powders. Among them, the LSCM is the most commonly used for example. The power clusters are formed of one of the above mentioned perovskite structured powders and a organic binder. For example, before being applied to spray, LSCM powders are agglomerated with the adhesive binder such as polyvinyl alcohol (PVA) to form micron scale powder clusters by a spray dryer. Besides PVA, the adhesive binder can be others with adhesive property and can be burned off by high temperature plasma flame.

In the atmospheric plasma spraying process to form a diffusion barrier layer, the first powder clusters are injected by a powder feeder into the high temperature and high speed plasma flame generated in ambient air, then the adhesive organic binder in the first powder clusters are burned off and the residual micron-size or sub-micron-size oxide particles are heated and accelerated to a molten or semi-molten high speed state, these molten or semi-molten high speed oxide particles hit the porous permeable metal substrate 1 and form splats on the porous permeable metal substrate 1. The overlapping splats on the porous permeable metal substrate 1 form the diffusion barrier layer 2.

After the formation of the diffusion barrier layer 2, the nano-composite film 3 is formed on the diffusion barrier layer 2 by the same process (technology). The second powder clusters are also micron-size powder clusters formed by agglomerating metal oxide nanoparticles with the adhesive binder such as polyvinyl alcohol (PVA) in a spray dryer. The metal oxide nanoparticles are composed of two different nano-scale metal oxide materials. One is the nano-scale oxygen-ion-conducting metal oxide material with good stability in hydrogen reduction, such as nano-scale yttria stabilized zirconia (YSZ), or nano-scale scandia stabilized zirconia, or nano-scale gadolinium-doped ceria, or nano-scale lanthanum-doped ceria; the other is the nano-scale metal oxide material that is easy to be reduced into metal in hydrogen reduction, such as nano-scale nickel oxide, or nano-scale copper oxide, or nano-scale cobalt oxide. Moreover, the sizes of the second powder clusters range from 1 micrometer to 100 micrometers while the sizes of the metal oxide nanoparticle are smaller than 100 nanometers. After two kinds of nano-scale substance being mixed with the adhesive binder and agglomerated by spray dryer, the formed second powder clusters are sent into the high temperature and high speed plasma flame to be heated. The organic adhesive binder is burned off and the residual nano-scale metal oxide powder particles are heated to a molten or semi-molten state. After these molten or semi-molten metal oxide powder particles hit the diffusion barrier layer 2, they form the nano-composite film 3 over the diffusion barrier layer 2.

The atmospheric plasma spraying device used in the step S2 and the step S3 has been disclosed in the U.S. Pat. No. 8,053,142. An operating current of the plasma torch used ranges from 318 A to 400 A (Ampere), an operating voltage thereof ranges from 100V to 110V, and an operating power is ranging from 35 kW to 45 kW. By adjustment of a robotic arm, the distance between the porous permeable metal substrate 1 and the plasma torch can be ranged from 8 cm to 12 cm. The plasma torch scans the porous permeable metal substrate 1 at 300~3000 cm/min scanning speed along X-Y direction. Moreover, the width of the scan path is about 0.5 centimeter (cm) to 3 cm and the scanning is in the X-direction and then the Y-direction or firstly in the Y-direction and then the X-direction. The scanning covers each point on the porous permeable metal substrate 1. The number of times of scanning depends on the thickness of the deposit film. Thus the film with even thickness is obtained.

In the plasma torch, the gas passing through the space between thoriated tungsten cathode and copper anode of the torch is heated by an electrical arc formed between these electrodes to form the high temperature and high speed plasma flame. The gas can be pure argon, a gas mixture of argon and hydrogen, a gas mixture of argon and helium, a gas mixture of argon and nitrogen, a gas mixture of argon, hydrogen and helium, a gas mixture of argon, nitrogen and helium or a gas mixture of argon, hydrogen, helium and nitrogen. The flow rate of the argon gas ranges from 38~80 slpm (standard liter per minute, volumetric flow rate of gas at 1 atmospheric pressure). The flow rate of the hydrogen gas is 3~10 slpm. The flow rate of the helium gas is 8~40 slpm. The flow rate of the nitrogen gas is 3~20 slpm.

The above parameters represent only an embodiment of the plasma torch used in the present invention, not intended to limit the scope of the invention.

After completing the step S2 and the step S3, the step S4 is followed. The nano-composite film 3 is reduced by hydrogen reduction. The hydrogen reduction is done at 500~800° C. in a mixed gas of 7% hydrogen and 93% argon for 2~10 hours. The mixed gas of 7% hydrogen and 93% argon flows usually in a direction almost perpendicular to the nano-composite film 3. Thus oxygen in the nano-composite film 3 reacts with hydrogen to produce water, and therefore the nano-composite film 3 consisting of the metal nanoparticles 31, the metal oxide nanoparticles 32, and the nano gas pores 33 that connected to form nano gas channels is obtained.

The method of the present invention further includes a step S5: to coat other functional thin films used in SOFC cells over the nano-composite film. This step can be performed before or after the step S4.

Figure 5:
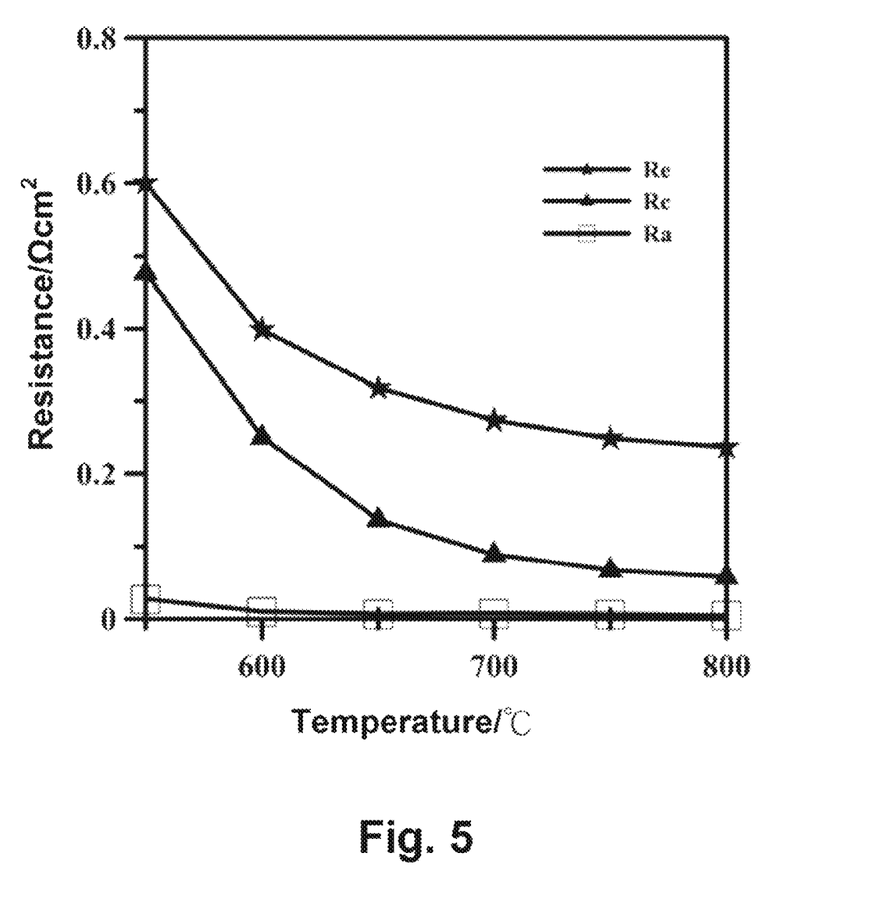
FIG. 5 is a schematic drawing showing curves of electrolyte resistance Re, cathode resistance Rc and anode resistance Ra changed along with the temperature according to the present invention.

In order to prove the anode of the present invention has a low anode polarization resistance, a Ni/Fe-LSCM-LDC/Ni-LDC-LSGM-SSC/LSGM-SSC SOFC cell is prepared by the atmospheric plasma spray for measurement and an AC impedance analyzing method is used to measure the impedance properties of this cell at 600° C., 650° C., 700° C., 750° C. and 800° C. respectively. By applying an equivalent circuit analysis on the obtained impedance data, values of the polarization resistance of the anode Ra (from LSCM and LDC/Ni layers), the electrolyte resistance Re (from LDC and LSGM layers), and the polarization resistance of the cathode Rc (from SSC/LSGM and SSC layers) at different temperatures mentioned above are obtained. The curves of the Ra, Re and Rc varying along with the temperature are shown in FIG. 5. In the figure, it is shown that Re>Rc>>Ra and Ra<0.5 $\Omega cm^2$. The polarization resistance of the anode Ra of the present invention is very small.

Figure 6:
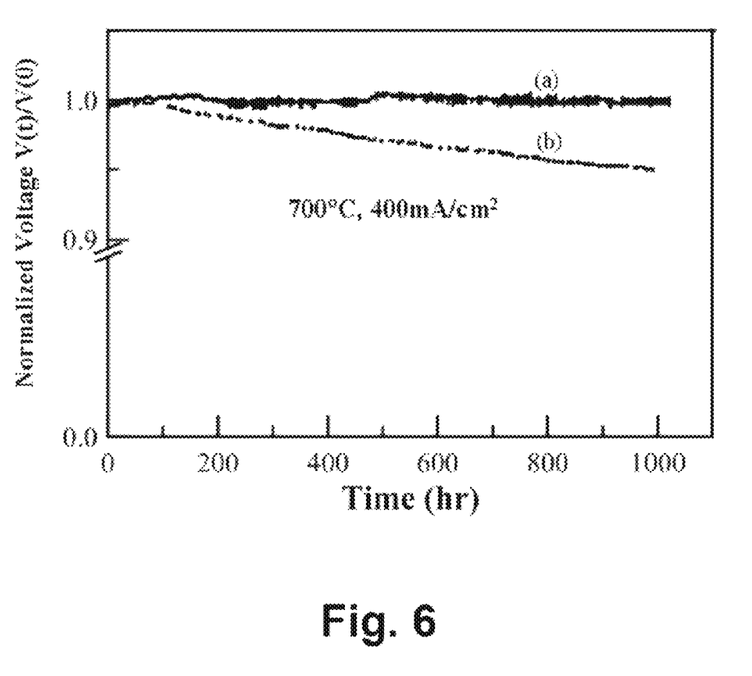
FIG. 6 is a schematic drawing showing changes of stability of solid oxide fuel cells with different anodes according to the present invention.

In order to prove the anode of the present invention with a low degradation rate, two 10×10 $cm^2$ SOFC cells are prepared. The anode of one SOFC cell is produced by using the LDC/NiO powder clusters of present invention in the atmospheric plasma spray. The other anode of other SOFC cell is produced by using the LDC/NiO powder clusters with carbon pore former in the atmospheric plasma spray. The LDC/NiO powder clusters with carbon pore former contain 85 wt % LDC/NiO and 15 wt % carbon pore former and were used in the previous techniques. The SOFC cells with different anodes are tested for long-term stability at the condition of air flow rate of 2000 cc/min, hydrogen flow rate of 800 cc/min, 700° C. and constant current density of 400 $mA/cm^2$. The results are shown in the FIG. 6. Comparing with the anode (b) of prior art, the SOFC anode (a) of the present invention has relatively small degradation rate in the long-term stability test. The degradation rate of the present invention is less than 1% per 1000 hours in this long-term stability test. Although the addition of the carbon pore former increases the porosity and permeability of anode, but the nickel nanoparticles around the surfaces of the pores produced by carbon pore former can aggregate or agglomerate to form larger nickel particles because the shortage of LDC (lanthanum-doped ceria) particles around the pores results in no enough strength from 3D LDC network for inhibiting nickel aggregation or agglomeration. The anode with such pore design leads to the decreasing of tri-phase boundaries and the increasing of anode polarization resistance over the test time so that the cell voltage is reducing along with increasing test time.

In the embodiment of the present invention, the diffusion barrier layer and the nano-composite film are deposited together over the porous permeable metal substrate by atmospheric plasma spray to form the solid oxide fuel cell anode. This kind of solid oxide fuel cell anode works with high efficiency (very low Ra) and long-term stability at the intermediate temperature range (600~800° C.), therefore it provides significant economic benefits.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A solid oxide fuel cell anode comprising:
a porous permeable metal substrate;
a diffusion barrier layer disposed over the porous permeable metal substrate; and
a nano-composite film disposed over the diffusion barrier layer and having a plurality of metal nanoparticles, a plurality of metal oxide nanoparticles, and a plurality of nano gas pores that are connected to form a plurality of nano gas channels;, the sizes of the metal nanoparticles are larger than the sizes of the metal oxide nanoparticles, and the sizes of the metal nanoparticles are about 2 to 4 times of the sizes of the metal oxide nanoparticles;
wherein the metal nanoparticles connect with one another to form a 3-dimensional (3D) electron conductive network while the metal oxide nanoparticles connect to form a 3D oxygen ion conductive network, the 3D electron conductive network and the 3D oxygen ion conductive network are interlaced or intermixed each other, the nano gas pores between the metal nanoparticles and the metal oxide nanoparticles are formed by hydrogen reduction, the size of the metal nanoparticles is smaller than 100 nm, the size of the metal oxide nanoparticles is smaller than 40 nm, and the size of the nano gas pores and the size of the nano gas channels are smaller than 100 nm, the diffusion barrier layer is made of a compound with perovskite structure selected from the group consisting of lanthanum strontium manganese chromite, lanthanum strontium manganese cobaltite, lanthanum strontium chromite, and lanthanum strontium cobaltite, the lanthanum strontium manganese chromite is $La_{75}Sr_{0.25}Cr_{0.5}Mn_{0.5}$.

2. The solid oxide fuel cell anode as claimed in claim 1, wherein the porous permeable metal substrate is made from nickel, nickel alloy, stainless steel, iron-nickel alloy, or iron-chromium alloy.

3. . The solid oxide fuel cell anode as claimed in claim 1, wherein a thickness of the porous permeable metal substrate ranges from 0.6 mm to 2.0 mm.

4. The solid oxide fuel cell anode as claimed in claim 1, wherein a permeability of the porous permeable metal substrate is larger than 1 Darcy.

5. The solid oxide fuel cell anode as claimed in claimed 1, wherein a thickness of the diffusion barrier layer ranges from 10 μm to 20 μm.

6. The solid oxide fuel cell anode as claimed in claimed 1, wherein the diffusion barrier layer is a permeable layer and having pores whose size are smaller than 5 μm.

7. The solid oxide fuel cell anode as claimed in claimed 1, wherein the metal nanoparticles are made from nickel or copper or cobalt.

8. The solid oxide fuel cell anode as claimed in claimed 1, wherein the metal oxide nanoparticle is made from yttrium stabilized zirconia, scandia stabilized zirconia, gadolinia-doped ceria, or lanthanum-doped ceria.

9. The solid oxide fuel cell anode as claimed in claimed 1, wherein the size of the metal nanoparticle ranges from 30 nm to 100 nm.

10. The solid oxide fuel cell anode as claimed in claimed 1, wherein the size of the metal oxide nanoparticle ranges from 10 nm to 40 nm.

11. The solid oxide fuel cell anode as claimed in claimed 1, wherein a thickness of the nano-composite film ranges from 20 μm to 30 μm.

* * * * *